United States Patent [19]
Johnson

[11] 3,803,670
[45] Apr. 16, 1974

[54] FASTENER DEVICE

[76] Inventor: William J. Johnson, 8060 St. Paul, Detroit, Mich. 48214

[22] Filed: Aug. 14, 1972

[21] Appl. No.: 280,155

Related U.S. Application Data
[63] Continuation-in-part of Ser. No. 135,894, April 21, 1971, Pat. No. 3,717,377.

[52] U.S. Cl.................................. 24/73 P, 85/5 R
[51] Int. Cl............................................ F16b 21/00
[58] Field of Search......... 85/5 P, DIG. 2, 5 R, 80; 24/106, 107, 73 P, 73 PF, 73 PP, 73 SM, 214, 213 B, 213 R, 213 CS

[56] References Cited
UNITED STATES PATENTS

| 28,844 | 6/1860 | Fisher..................................... 85/5 P |
| 1,426,237 | 8/1922 | Witzberger............................ 85/5 P |
| 1,515,974 | 11/1924 | Smith..................................... 24/107 |
| 2,421,238 | 5/1947 | Borah.............................. 24/73 P UX |
| 2,649,884 | 8/1953 | Westover................................ 85/80 |
| 3,169,439 | 2/1965 | Rapata.................................. 85/5 R |
| 3,315,558 | 4/1967 | Fischer.................................. 85/80 |
| 3,717,066 | 2/1973 | Maurer.................................. 85/5 R |

FOREIGN PATENTS OR APPLICATIONS

| 1,103,760 | 6/1955 | France................................... 85/5 R |
| 1,574,183 | 7/1969 | France.................................... 85/80 |
| 1,134,247 | 11/1968 | Great Britain....................... 85/5 R |

Primary Examiner—Donald A. Griffin
Attorney, Agent, or Firm—Barnes, Kisselle, Raisch & Choate

[57] ABSTRACT

A device for fastening together lapped panels having a hole therethrough. The device has a snap pin with a head and a shank portion with a pair of radially spaced resilient and flexible fingers adapted to extend through the hole of the panels and receive a washer releasably retained thereon by a pair of generally opposed lobes on the free ends of the fingers.

14 Claims, 5 Drawing Figures

PATENTED APR 16 1974  3,803,670

FASTENER DEVICE

REFERENCE TO A COPENDING APPLICATION

This is a continuation-in-part of my copending U. S. application Ser. No. 135,894, filed Apr. 21, 1971, and entitled "Paperboard Chair," and now issued as U.S. Pat. No. 3,717,377 dated Feb. 20, 1973.

This invention relates to fastener devices and more particularly to a device for fastening lapped panels together.

Objects of this invention are to provide a device for fastening lapped panels which can be readily manually assembled in fastening relationship and disassembled to release the panels without the use of any tools and which is reusable, durable and of economical manufacture.

These and other objects, features and advantages of this invention will be apparent from the following detailed specification, appended claims and accompanying drawing in which:

Figure 1:
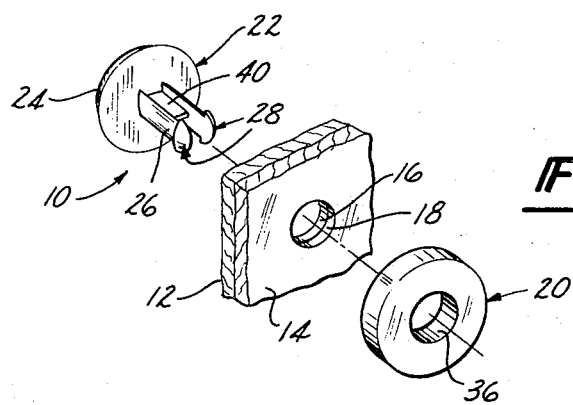
FIG. 1 is a perspective view of a fastener device embodying this invention positioned to be inserted through aligned holes in lapped panels to fasten the panels together.
Figure 2:
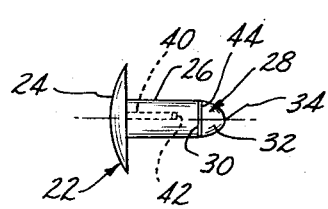
FIGS. 2 and 3 are side and end views respectively of a snap pin of the fastener of FIG. 1.
Figure 3:
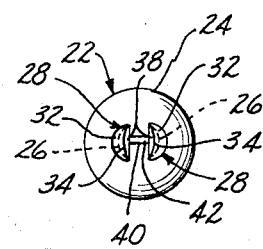
Figure 4:
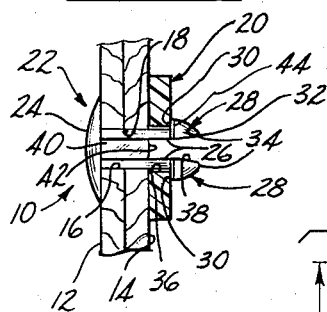
FIG. 4 is a fragmentary sectional view of the panels of FIG. 1 with the snap pin and a retainer washer of the fastener device in assembled relation fastening the lapped panels together.

Referring in more detail to the drawing, FIGS. 1 and 4 illustrate a fastener device 10 embodying this invention for fastening together lapped panels 12 and 14 with axially aligned holes 16 and 18 therethrough. Fastener device 10 can be used to secure substantially incompressible panels made of materials such as steel, plastic and wood and with panels of a slightly flexible and resilient material such as corrugated cardboard. Fastener device 10 has a retainer washer 20 adapted to be received over the free end of a snap pin 22.

Snap pin 22 has a domed head 24 and a shank portion with a pair of integrally spaced fingers 26 extending generally axially from the flat face of head 24. The free ends of fingers 26 terminate in generally radially opposed integral lobes 28. Lobes 28 have abutment surfaces 30 extending generally radially outwardly of fingers 26 and adapted to lap with and bear on the outer face of retainer washer 20 when it is slidably received on finger 26 of snap pin 22. To facilitate sliding retainer washer 20 over lobes 28 each lobe has a generally convex outer cam surface 32 sloping radially outwardly as it extends toward head 24 of snap pin 22. To further facilitate sliding washer 20 over lobes 28, the free end of each lobe terminates in an apex 34 which is normally radially inward of the bore 36 of retainer washer 20 when it is coaxially aligned with snap pin 22. Each lobe 28 has an inner flat surface 38 sloping generally radially outwardly toward its apex 34 to provide adequate clearance between lobes 28 to move radially inwardly sufficiently to allow washer 20 to slide over the lobes and be received on fingers 26.

Fingers 26 are slightly flexible and resilient and the extent of this flexibility and resiliency is affected by how far a web 40 between and integral with fingers 26 extends generally axially toward the free ends of the fingers. If snap pin 22 is made homogeneously integral in one piece of a slightly flexible and resilient plastic material such as polypropylene plastic, fingers 26 will be sufficiently resilient and flexible if the free end 42 of web 40 terminates immediately adjacent the inboard face of washer 20 when it is received on the fingers and bearing on lobes 28. Both snap pin 22 and washer 20 can be economically manufactured by injection molding. Other sufficiently resilient and flexible plastic materials are believed to be polyethylene, high impact polystyrene, nylon and cycolac (ABS) plastics. To facilitate molding lobes 28 and to decrease the tendency of the outer edge of radially extending surface 30 of the lobes to be chipped or eroded away when retainer washer 20 is urged over the lobes an axially extending surface or land 44 is provided on the generally radially outermost portion of the lobe immediately adjacent abutment surface 30.

The diameter of hole 36 of retainer washer 20, the major diameter of fingers 26 in the normal unflexed position, and the major diameter of lobes 28 in both the normal and displaced positions are dimensioned in relation to each other such that when the fingers are in the normal position washer 20 can be slidably received on the fingers and retained thereon by abutment surfaces 30 of lobes 28 and when the fingers are flexed and lobes 28 moved radially inwardly adjacent each other, washer 20 can pass over the lobes to be received on and removed from fingers 26.

In using device 10, panels 12 and 14 are provided with holes 16 and 18 therethrough with diameters substantially equal to the diameter of fingers 26 of snap pin 22 in their normal unflexed position. Preferably, holes 16 and 18 are preformed in panels 12 and 14. The panels are placed in face to face lapping relationship with holes 16 and 18 axially aligned with each other and retainer washer 20 is positioned against the outer face of one of the panels such as panel 14. Lobes 28 of snap pin 22 are aligned with the hole 16 of the other panel 12 and inserted through panels 12 and 14 and washer 20 to fasten the panels together as shown in FIG. 4. As lobes 28 are initially inserted into hole 16 in panel 12, lobe surfaces 32 cam the lobes radially inwardly so that the lobes can pass through holes 16 and 18 of the panels and hole 36 of retainer washer 20. This radially inward movement of lobes 28 flexes resilient fingers 26 so that when lobes 28 pass completely through holes 36 of washer 20, the lobes suddenly snap radially outwardly so that their abutment surfaces 30 lap with the outer face of washer 20 (as shown in FIG. 4) to releasably retain washer 20 on fingers 26 and thereby fasten panels 12 and 14 together. An alternate procedure for fastening panels 12 and 14 together with device 10 is to insert lobes 28 of snap pin 22 through aligned holes 16 and 18 of lapped panels 12 and 14 and then to slide retainer washer 20 over lobes 28 so that abutment surfaces 30 of the lobes snap into lapping or locking engagement with the outer face of washer 20. Fastener device 10 can be removed from panels 12 and 14 to unfasten them by manually shifting lobes 28 inwardly toward each other to disengage abutment surfaces 30 from washer 20 and then pushing snap pin 22 generally axially through washer 20 and panels 12 and 14.

Assembly of fastener device 10 through panels 12 and 14 is greatly facilitated by an increase in the effective length of pin 22 due to the generally arcuate movement of the radially outermost portion of abutment surfaces 30 when fingers 26 are flexed by inserting snap pin 22 through the panels. When fingers 26 are flexed to shift lobes 28 inwardly toward each other, abutment surfaces 30 pivot in generally arcuate paths substantially about the points in their associated fingers 28 where web 40 terminates in free end 42. This generally arcuate movement substantially increases the generally axial distance between the inner flat face of head 24 and the radially outer edge or corner of surface 30 of each lobe 28 thereby increasing the effective length of snap pin 22 compared to its unflexed or normal length. Hence, when snap pin 22 is flexed, its effective length is increased so that it can project further through panels 12 and 14 to more readily engage the outer face of washer 20. As lobes 28 snap into engagement with washer 20, fingers 26 return to their normal unflexed position thereby shortening the effective length of snap pin 22 and moving washer 20 toward head 24 to firmly engage and fasten together panels 12 and 14. This increase and decrease in the effective length of snap pin 22 during installation thereof particularly facilitates using fastener devices 10 with substantially incompressible panels such as steel, plastic and wood panels. When fastener device 10 is made for use with incompressible panels, snap pin 22 and washer 20 are preferably dimensioned so that in assembly with fingers 26 in their normal unflexed position, the generally axial distance between the opposed inner face of head 24 and washer 20 is substantially equal to the total thickness of the lapped panels at the point where fastener device 10 is inserted through the panels.

Fastener device 10 can be made for use with panels of varying thicknesses and for fastening together three or more panels by varying the axial length of fingers 26. If the panels are made of a slightly flexible and resilient material such as corrugated cardboard, they can be more securely connected together if fastener device 10 is designed so that it places the panels in slight compression in an area immediately adjacent the fastener device. To place this area of the panels in compression and the fingers of the fastener device in tension, fastener device 10 is designed so that when assembled, the generally axial distance between the inner face of washer 20 and the opposed inner face of head 24 is less than the normal uncompressed thickness of the lapped panels. In practice, dimensioning fastener device 10, so that its axial distance in assembly between the inner face of washer 20 and the generally opposed inner face of head 24 is substantially equal to the thickness of the lapped panels less the extent of the increase of the effective length of snap pin 22 due to flexing of fingers 26 has proved to be highly satisfactory. This dimensioning of fastener device 10 allows it to be readily assembled through the lapped panels while still compressing the area of the panels immediately adjacent the fastener device to 80 to 95 percent of its natural uncompressed total thickness with panels of lesser total thickness being compressed to a greater proportion than panels of greater total thickness.

Figure 5:
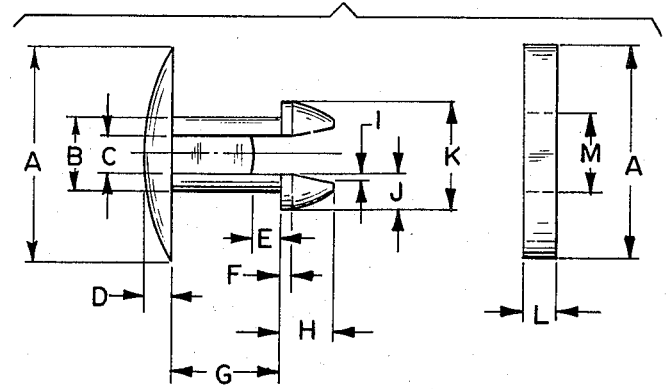
FIG. 5 is an enlarged side view of the fastener device with the dimensions thereof indicated by reference letters.

Suitable fastener devices 10 for use with corrugated cardboard panels each having a thickness of 0.141 inches and a Mullen punch test rating of 275 pounds, have the following dimensions:

| Reference Letter | Dimension in inches |
| --- | --- |
| A | 0.750 |
| B | 0.250 |
| C | 0.125 |
| D | 0.094 |
| E | 0.131 |
| F | 0.025 |
| G | (0.381 for two panels of cardboard |
|  | (0.522 for three panels of cardboard |
|  | (0.663 for four panels of cardboard |
| H | 0.181 |
| I | 0.031 |
| J | 0.125 |
| K | 0.375 |
| L | 0.147 |
| M | 0.270 | where the letters refer to the dimensions of FIG. 5 of the drawing. These snap pins 22 have a web thickness of 0.040 of an inch, a maximum lobe land diameter of 0.250 of an inch, and a change in effective length due to flexing of fingers 26 of approximately 0.044 of an inch.

Since resilient fingers 26 are flexed within the elastic limit of the plastic material, fastener device 10 is reusable. Since only a modest manual force is required to move lobes 28 radially inwardly fastener device 10 can be manually assembled and disassembled without using any tools. Both retainer washer 20 and snap pin 22 can each be made in one homogeneous piece of a slightly flexible and resilient plastic material, such as polypropylene plastic by injection molding and thus are of economical construction. A plurality of snap pins 22 and washers 20 can be injection molded on a single runner and in many instances economically packaged and sold to the ultimate user still attached to the runner. For example, snap pins 22 and washers 20 still attached to their molding runner can be sold to the ultimate user as part of a do-it-yourself kit of unassembled preformed corrugated cardboard panels for assembly into furniture such as a chair. This furniture is assembled by the ultimate user who separates the washers 20 and snap pins 22 from their molding runner to provide fastener devices 10 for fastening the corrugated cardboard panels together to assemble the furniture.

I claim:

1. A fastener device for fastening together lapped panels having generally axially aligned holes therethrough comprising; a retainer washer having a hole therethrough and a one-piece snap pin of a homogeneous plastic material, said snap pin having a head adjacent one end and an integral shank portion extending generally axially therefrom with at least two radially spaced generally axially extending integral resiliently flexible fingers, each of said fingers having an integral lobe adjacent its free end, said fingers being adapted to slidably receive said washer thereon and extend through said hole thereof, each of said lobes having an abutment surface thereon extending generally radially outward of said fingers and lapping said washer when slidably received on said fingers to retain said washer thereon when urged generally axially away from said head of said snap pin, a web integral with and extending generally axially between said radially spaced fingers with its free end terminating immediately adjacent the annular face of said retainer washer when said retainer washer is received on said fingers with the outer face thereof bearing on said abutment surfaces of said lobes, and said lobes being dimensioned with respect to said hole of said washer such that when urged generally radially inwardly said fingers are flexed and said lobes will slide through said hole in said washer, whereby when said snap pin is inserted through the generally axially aligned holes in the lapped panels and said washer which flexes said fingers and initially shifts said lobes generally radially inwardly they snap generally radially outwardly to lap said abutment surfaces with said washer on said shank to fasten the panels together.

2. The fastener device of claim 1 for fastening lapped panels of a slightly flexible and resilient material such as corrugated cardboard wherein the axial distance between said abutment surface of each of said lobes and said head of said snap pin is dimensioned such that when said washer is received on said fingers and bearing on said abutment surface the axial distance between the adjacent opposed faces of said head and said washer is intentionally dimensioned less than the total thickness of the lapped panels in their normal uncompressed state, whereby the panels are placed in compression by said fastener immediately adjacent thereto and said fingers of said snap pin are placed in tension.

3. The fastener device of claim 2 wherein said axial distance between the adjacent opposed faces of said head and said washer is not more than nine-tenth of the thickness of the lapped panels in their free uncompressed state.

4. The fastener device of claim 2 wherein each of said abutment surfaces terminates generally radially outwardly of its associated finger such that the effective length of said snap pin is increased when said fingers are flexed to move said lobes generally radially inward and decreased when said fingers return to their normal unflexed position whereby assembly of said retainer washer on said snap pin to fasten the panels together is facilitated.

5. The fastener device of claim 1 wherein said web is also integral with said head of said snap pin.

6. The fastener device of claim 1 wherein said snap pin has only one pair of radially spaced fingers with one pair of generally radially opposed lobes each integral with its associated finger.

7. The fastener device of claim 1 wherein each of said lobes has an outer cam surface sloping generally radially inwardly as said cam surface extends generally axially away from said head of said snap pin and terminates generally radially inwardly of the hole of said washer when said hole of said washer is coaxial with said shank and said fingers are in their normal unflexed position.

8. The fastener device of claim 7 wherein each of said lobes has an inner surface which slopes generally radially outwardly as said inner surface extends generally axially away from said head of said snap pin to allow said lugs to be displaced generally radially inwardly sufficiently for said retainer washer to pass over said lugs to be received on and removed from said fingers.

9. The fastener device of claim 1 wherein each of said lobes has an inner surface which slopes generally radially outwardly as said inner surface extends generally axially away from said head of said snap pin to allow said lugs to be displaced generally radially inwardly sufficiently for said retainer washer to pass over said lugs to be received on and removed from said fingers.

10. The fastener device of claim 1 wherein said homogeneous plastic material is a polypropylene plastic.

11. The fastener device of claim 1 wherein both said washer and said snap pin are each a homogeneous polypropylene, polyethylene, high impact polystyrene, nylon or cycolac plastic material.

12. The fastener device of claim 1 for fastening lapped panels of an incompressible material wherein the axial distance between said abutment surface of each of said lobes and said head of said snap pin is dimensioned such that when said washer is received on said fingers and bearing on said abutment surface, the axial distance between the adjacent opposed faces of said head and said washer is intentionally dimensioned to be substantially equal to the total thickness of the lapped panels immediately adjacent the aligned holes in said panels through which said snap pin extends when fastening the lapped panels together.

13. The fastener device of claim 17 wherein each of said abutment surfaces terminates generally radially outwardly of its associated finger such that the effective length of said snap pin is increased when said fingers are flexed to move said lobes generally radially inward and decreased when said fingers return to their normal unflexed position whereby assembly of said retainer washer on said snap pin to fasten the panels together is facilitated.

14. The fastener device of claim 1 wherein each of said abutment surfaces terminates generally radially outwardly of its associated finger such that the effective length of said snap pin is increased when said fingers are flexed to move said lobes generally radially inward and decreased when said fingers return to their normal unflexed position whereby assembly of said retainer washer on said snap pin to fasten the panels together is facilitated.

* * * * *

PO-1050
(5/69)

UNITED STATES PATENT OFFICE
CERTIFICATE OF CORRECTION

Patent No. 3,803,670  Dated April 16, 1974

Inventor(s)  WILLIAM J. JOHNSON

It is certified that error appears in the above-identified patent and that said Letters Patent are hereby corrected as shown below:

Claim 13:

Column 6, line 33:  "17" should be --12--.

Signed and sealed this 17th day of September 1974.

(SEAL)
Attest:

McCOY M. GIBSON JR.
Attesting Officer

C. MARSHALL DANN
Commissioner of Patents